INVENTOR.
CORNELIS VAN DER LELY

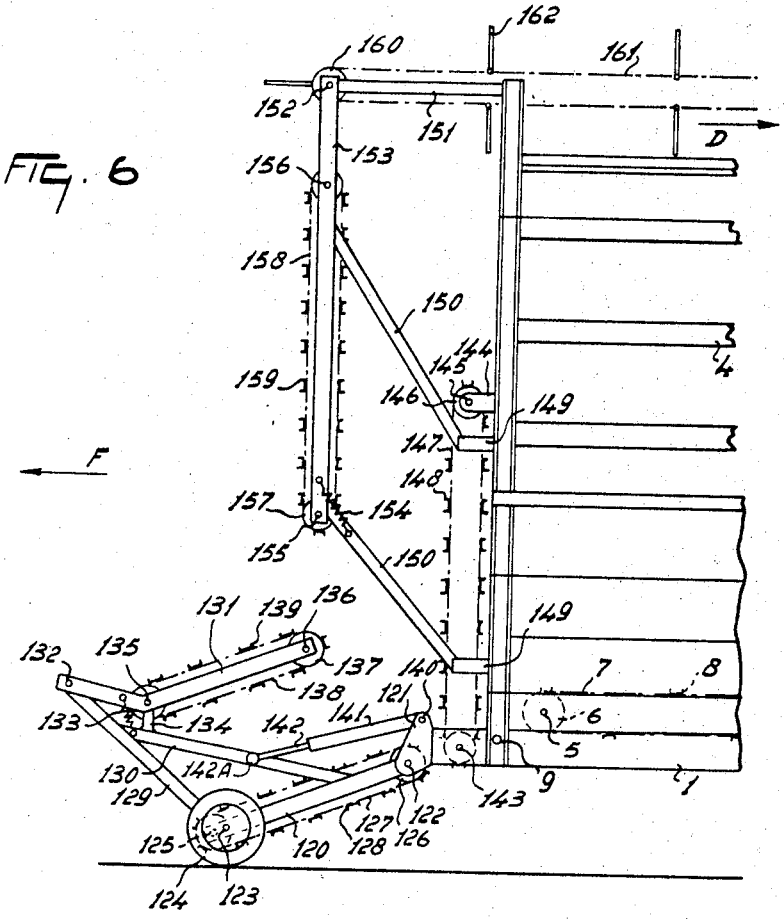

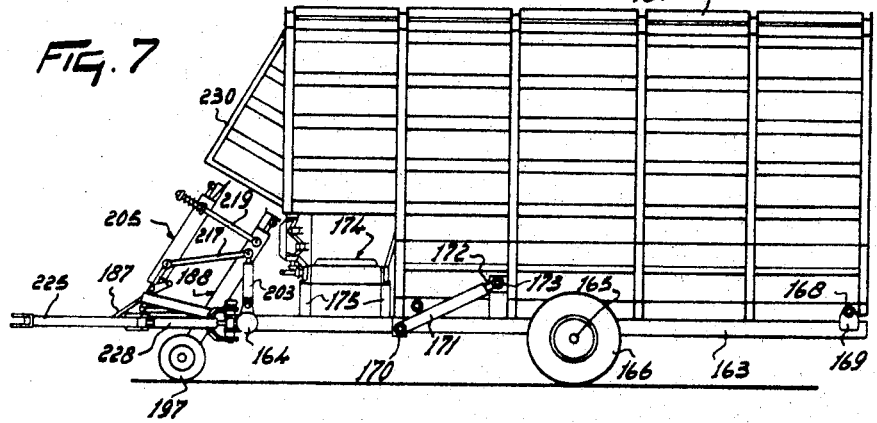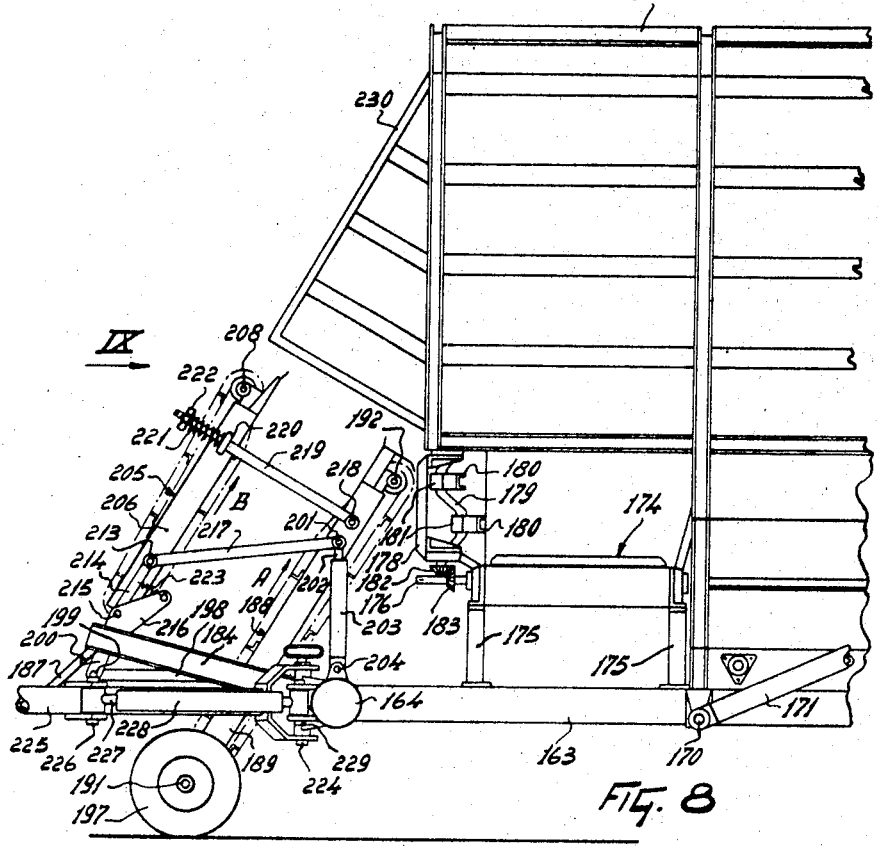

United States Patent Office 3,448,879
Patented June 10, 1969

3,448,879
AGRICULTURAL VEHICLES
Cornelis van der Lely, Zug, Switzerland, assignor to Texas Industries Inc., a limited liability company of the Netherlands Antilles
Filed July 26, 1965, Ser. No. 474,744
Claims priority, application Netherlands, Aug. 5, 1964, 6408946; May 6, 1965, 6505718
Int. Cl. B60p 1/36; B65g 65/06; A01d 87/04
U.S. Cl. 214—522                    33 Claims

ABSTRACT OF THE DISCLOSURE

An agricultural vehicle with a pick-up mechanism having at least one pair of spaced apart conveyors which move in opposite directions. The conveyors are arranged substantially parallel to one another and provided with portions which face one another so that crop can be moved between the conveyors to a loading area.

---

This invention relates to agricultural vehicles of the kind having a pick-up mechanism for bales lying on the ground.

An object of the invention is the provision of a simple and effective vehicle of the kind set forth.

According to the invention, there is provided an agricultural vehicle of the kind set forth, wherein the pick-up mechanism is fastened to the frame of the vehicle and a coupling member is provided with the aid of which the vehicle can be hitched to a tractor or other propelling vehicle in such a way that the paths of travel of the agricultural vehicle and tractor or other propelling vehicle do not coincide, and wherein the construction and arrangement of the pick-up mechansm and a load-carrying chamber of the vehicle are such that said mechanism can push bales directly into said chamber.

Figure 1:
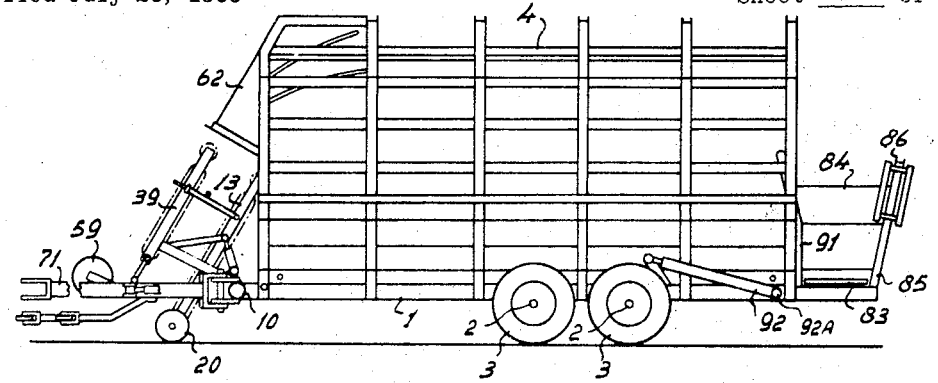
Figure 2:
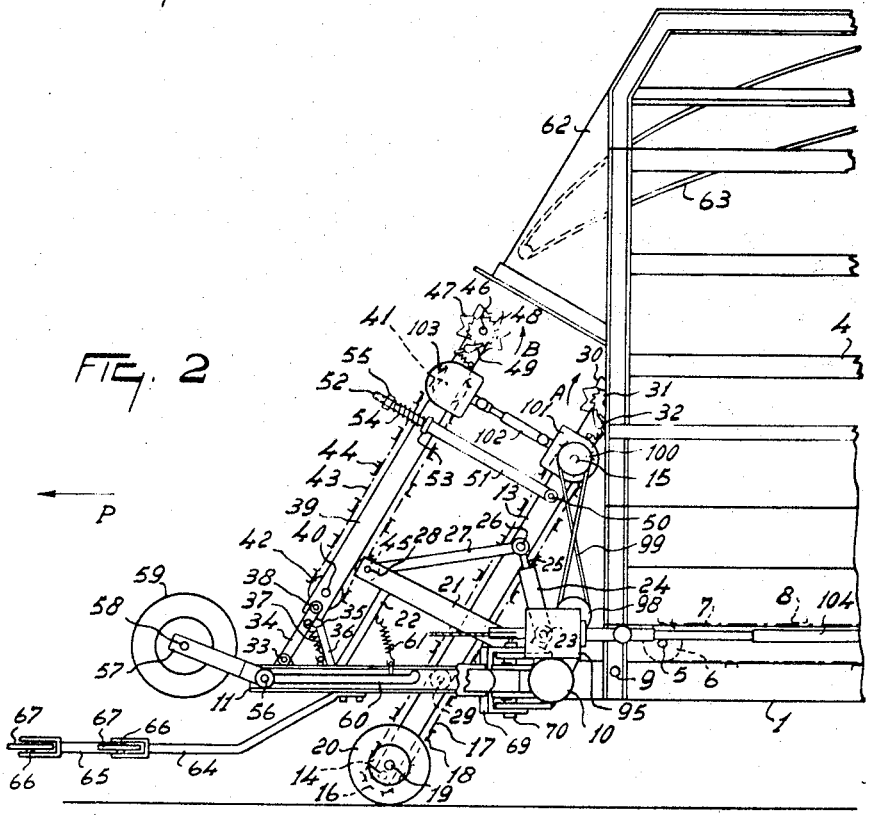
Figure 3:
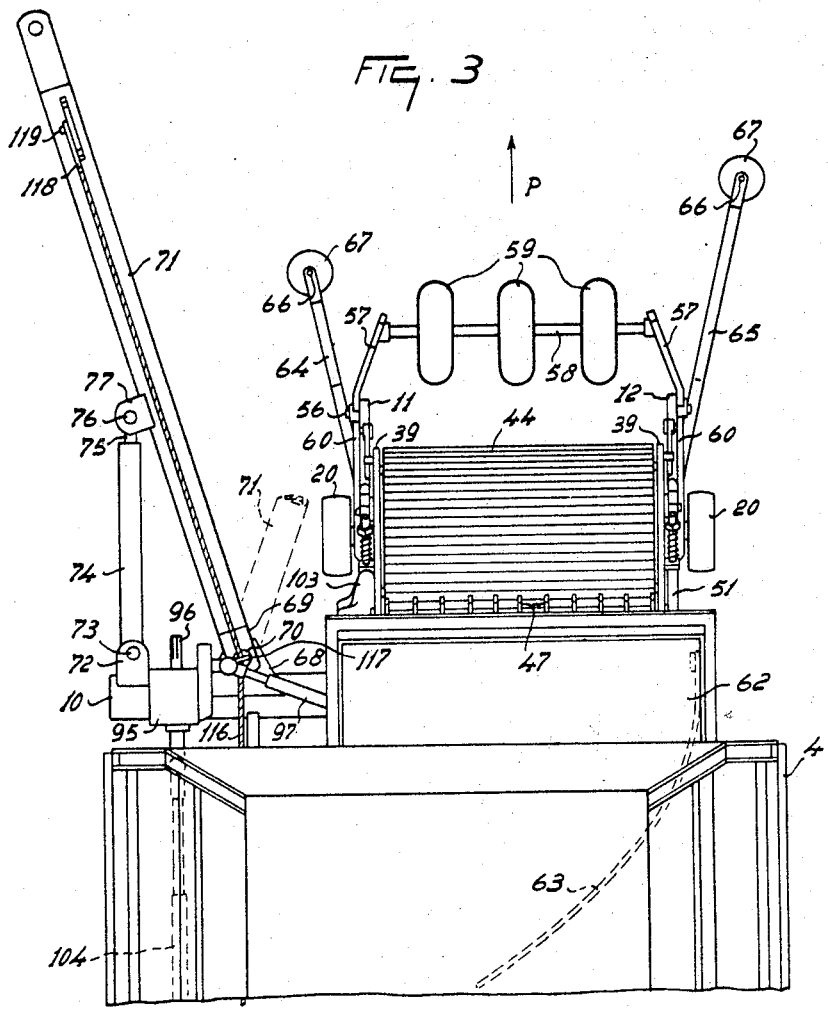
Figure 4:
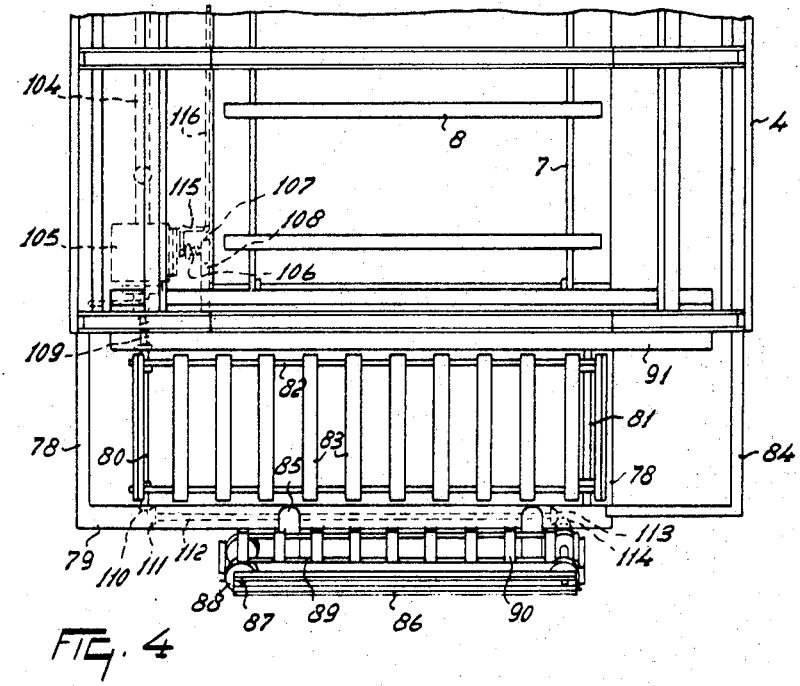
Figure 5:
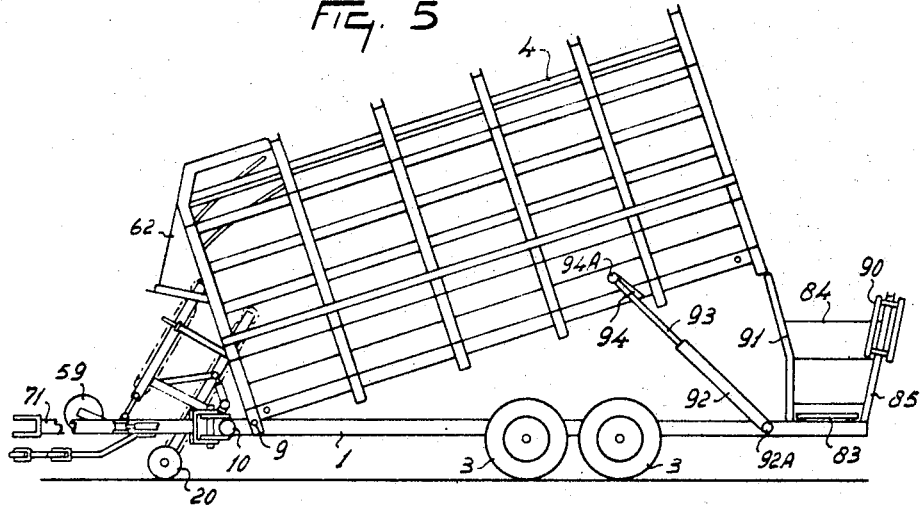
Figure 9:
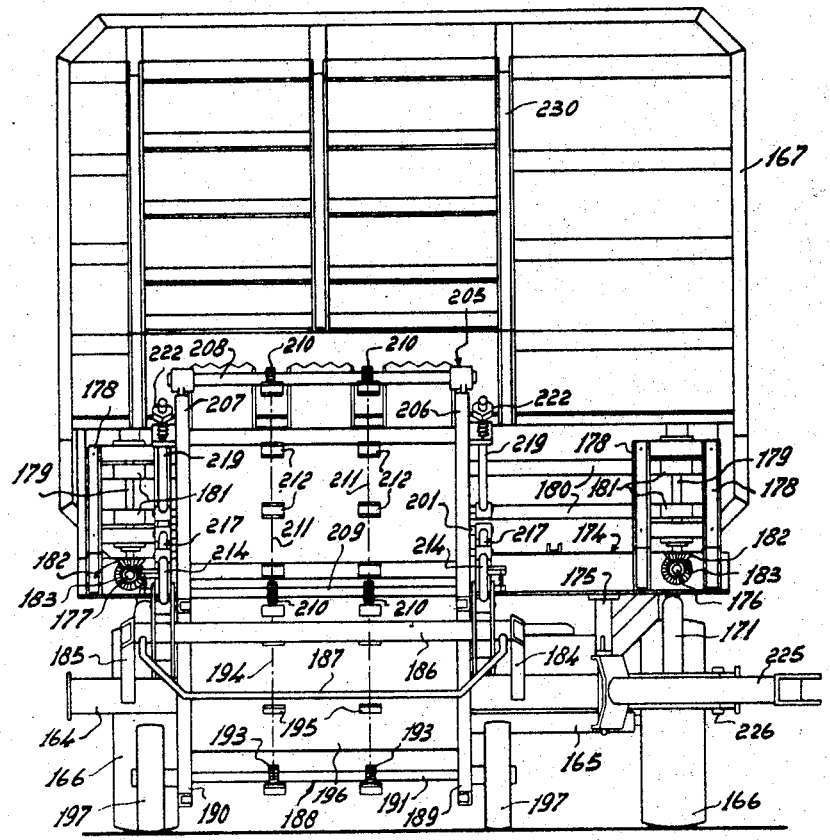

For a better understanding of the invention, and to show how the same may be carried into effect, reference will now be made, by way of example, to the accompanying drawings, in which:

FIGURE 1 is a side elevation of an agricultural vehicle in accordance with the invention taking the form of a machine for picking up and transporting bales, FIGURE 2 is a side elevation of a foremost region of the machine of FIGURE 1 showing certain parts to a larger scale and in greater detail, FIGURE 3 is a plan view corresponding to FIGURE 2, FIGURE 4 is a plan view of a rearmost region of the vehicle to the same scale as FIGURE 3, FIGURE 5 corresponds to FIGURE 1 but shows the vehicle occupying a load-discharging position, FIGURE 6 corresponds to FIGURE 2 but shows an alternative embodiment of a vehicle in accordance with the invention, FIGURE 7 corresponds to FIGURE 1 but shows a third embodiment of an agricultural vehicle in accordance with the invention, FIGURE 8 is a side elevation of a foremost region of the agricultural vehicle of FIGURE 7 showing certain parts of that vehicle to an enlarged scale and in greater detail, and FIGURE 9 is a front elevation as seen in the direction indicated by the arrow IX of FIGURE 8.

Referring to FIGURES 1 to 5 of the drawings, the agricultural vehicle has two longitudinal frame beams 1 which are interconnected by a plurality of transverse beams. A pair of axles 2 are secured to the beams 1 and four ground wheels 3 that support the frame of the vehicle on the ground are rotatably mounted at opposite ends of said axles. The vehicle has two side walls 4 lowermost and uppermost portions of each of which are vertically disposed and intermediate portions of which are inclined upwardly and outwardly from the center of the vehicle. Thus, the ground wheels 3 at opposite sides of the vehicle are closer together than are the uppermost portions of the side walls 4 so that each of the last-mentioned portions overhangs the corresponding ground wheel 3. This arrangement allows the frame beams 1 to be at approximately the same level as the axles 2 so that the center of gravity of the vehicle can be kept at a low level. Even when the vehicle is fully loaded, its center of gravity is still relatively low despite the fact that the vehicle has a large load-carrying space. A load-supporting floor is arranged between the lower portions of the two side walls 4, horizontal shafts 5 that extend perpendicular to the intended direction of operative travel that is indicated by the arrow P in FIGURE 2 of the drawings being arranged adjacent the foremost and rearmost ends of said floor. Sprockets 6 are secured to the two shafts 5 and endless chains 7 are wound around pairs of the sprockets 6 that are fastened to the respective shafts 5. Beams 8 of channel-shaped cross-section have their webs fastened to the chains 7 so that said beams extend parallel to the shafts 5 with their flanges projecting away from the chains 7. The upper runs of the chains 7 and the beams 8 together afford substantially all of the load-supporting floor referred to above. An ordinary immovable floor interconnects the lowermost portions of the side walls 4 beneath the chains 7.

The side walls 4, the floor that is fixed thereto and the chains 7, together with the parts that are associated with the latter, are turnable together relative to the beams 1 about a pair of stub shafts 9 that are secured to the beams 1 so as to extend parallel to the shafts 5. The leading ends of the beams 1 extend forwardly beyond the side walls 4 and are interconnected by a tubular frame beam 10. Two horizontal frame beams 11 and 12 project forwardly from the side of the tubular frame beam 10 remote from the beams 1. As can be seen best in FIGURE 3 of the drawings, considered in the intended direction of operative travel of the vehicle that is indicated by the arrow P, the beam 11 is located between the two frame beams 1 while the beam 12 is located to the right of the right-hand beam 1. The region between the beams 11 and 12 is therefore located to the right of the center of the vehicle considered in the same direction.

A pair of beams 13 of channel-shaped cross-section are arranged between the two beams 11 and 12, and as can be seen in FIGURE 2 of the drawings, extend obliquely upwardly and rearwardly from a point close to the ground surface relative to the direction P. Horizontal shafts 14 and 15 that extend perpendicular to the direction P are journalled in bearings carried at the uppermost and lowermost ends of the beams 13 respectively. Pairs of sprockets 16 are secured to the shafts 14 and 15 and endless chains 17 and channel-shaped cross-section beams 18, similar to the previously described sprockets 6, chains 7 and beams 8 together form a conveyor belt. Two ground wheels 20 are rotatably mounted on horizontal stub shafts 19 located at the lowermost ends of the beams 13 and parallel to the shafts 14 and 15.

Two frame beams 21 project upwardly and forwardly relative to the direction P from points adjacent the junctions between the beams 11 and 12 and the tubular beam 10. Struts 22 interconnect regions of the beams 21 that are locted towards the foremost and uppermost ends thereof and the upper sides of the beams 11 and 12 respectively. Hydraulic cylinders 24 are pivotally connected to the beams 21 towards the lowermost and rearmost ends of the latter by horizontal stub shafts 23 that extend parallel to the shafts 14 and 15. Each hydraulic cylinder 24 houses a piston provided with a piston rod 25 the free end of which is connected by a horizontal pivot pin 26, parallel to the stub shafts 23, to a beam 13 and to one end of a corresponding coupling rod 27 the opposite end of which is pivoted to the foremost and uppermost end of the corresponding frame beam 21 by means of a further horizontal relatively parallel pivot pin 28. Each of the frame beams 11 and 12 is provided with a corresponding roller 29 rotatable about a horizontal stub shaft extending parallel to the shafts 14 and 15. Each roller 29 is entered between the limbs of the corresponding adjacent channel-shaped beam 13 so that said rollers 29 act as guides for the beams 13.

The uppermost ends of the frame beams 13 are located, in the position of the vehicle illustrated in FIGURES 1 and 2 of the drawings, immediately above the uppermost end of the front wall of the load-carrying space of the vehicle, said uppermost and being located about half-way up the height of the vehicle. A shaft that extends parallel to the shaft 15 is journalled in bearings located at the extreme uppermost ends of the two beams 13. The shaft that has just been mentioned carries a plurality of star wheels 30. A ratchet wheel 31 is secured to the end of said shaft that is closest to the beam 11 and co-operates with a spring-loaded pawl 32 that is pivotally mounted on the adjacent beam 13. As will be evident from FIGURE 2 of the drawings, the pawl 32 and ratchet wheel 31 co-operate in such a way that the shaft carrying the star wheels 30 can rotate only in the direction indicated by the arrow A in that figure.

Each of the beams 11 and 12 has a corresponding coupling rod 34 turnably connected to it adjacent its leading end with the aid of a horizontal pivot pin 33. In the position of the coupling rods 34 that is illustrated in FIGURE 2 of the drawings, they are inclined upwardly and rearwardly from the pivot pins 33 relative to the direction P. Each coupling rod 34 carries a lug 35 which bears against the uppermost end of a corresponding arm 36 that is inclined upwardly and forwardly from the location at which one of the struts 22 is secured to the corresponding beam 11 or 12. Tension springs 37 extend between anchorages on the coupling rods 34 and the beams 11 and 12 respectively and tend to turn the coupling rods 34 in clockwise directions (as seen in FIGURE 2 of the drawings) about the pivot pins 33. When the various parts occupy the positions illustrated in FIGURE 2 of the drawings, the coupling rods 34 are prevented from turning further about the pivot pins 33 due to the co-operation of the lugs 35 and the uppermost ends of the arms 36.

The uppermost ends of the two coupling rods 34 are pivotally connected by pins 38, parallel to the pins 33, to the lowermost ends of beams 39 that are similar to, but shorter than, the beams 13. A shaft 40 that extends parallel to the pins 33 and 38 is rotatably journalled in bearings carried by the beams 39 immediately above the pins 38. A similar relatively parallel shaft 41 is journalled in bearings carried towards the uppermost ends of the two beams 39. The shafts 40 and 41 carry pairs of sprockets 42 and endless chains 43, and beams 44 of channel-shaped cross-section co-operate therewith to form a conveyor belt in substantially the same way as the previously described parts 6, 7 and 8 or 16, 17 and 18.

In the position of the beams 39 that is illustrated in FIGURE 2 in which they extend parallel to the beams 13, each beam 39 bears against a corresponding roller 45 rotatably mounted on one of the pivot pins 28 located at the leading end of the adjacent beam 21. A shaft 46 that extends parallel to the shafts 40 and 41 is rotatably mounted in bearings arranged at the extreme uppermost ends of the two beams 39. The shaft 46 carries a plurality of star wheels 47 (see also FIGURE 3) and, at the end thereof closest to the beam 11, carries a ratchet wheel 48 co-operating with a spring-loaded pawl 49 pivotally mounted on the adjacent beam 39. It will be evident from FIGURE 2 of the drawings that the pawl 49 and ratchet wheel 48 co-operate in such a way that the shaft 46 carrying the star wheels 47 can rotate only in the direction indicated by the arrow B which, it is noted, is opposite to the previously mentioned direction A.

Two coupling rods 51 are pivotally connected to the beams 13 by corresponding pivot pins 50 that extend parallel to the shafts 14 and 15. The ends 52 of the coupling rods 51 that are remote from the pivot pins 50 are of reduced diameter and are provided with screw-threads. These ends are entered through apertured lugs 53 that project from the sides of the beams 39. A helical compression spring 54 surrounds each screwthreaded end 52 between the corresponding lug 53 and a nut 55 which is adjustable axially of said end 52 to adjust the tendency of the spring 54 to urge the lug 35 into contact with the shoulder formed at the junction between the end 52 and the body of the corresponding coupling rod 51.

Horizontal stub shafts 56 that extend perpendicular to the direction P are carried at the front ends of the two beams 11 and 12. Arms 57 (FIGURES 2 and 3) are turnably mounted on the stub shafts 56 and project upwardly and forwardly therefrom relative to the direction P. The leading ends of the two arms 57 are interconnected by a horizontal shaft 58 upon which three pneumatically tyred wheels 59 are rotatably mounted. Arms 60 are secured to the two arms 57 at the locations of the corresponding stub shafts 56 and project rearwardly for a substantial distance terminating in bent-over ends that are entered between the flanges of the corresponding beams 11 and 12. A tension spring 62 extends between an anchorage on each strut 22 and each arm 60 and turns the corresponding arm 60 in a direction such that its bent-over end normally bears against the uppermost flange of the corresponding beam 11 or 12. The arrangement is such that the wheels 59 can deflect upwardly about the stub shafts 56 to some extent against resilient opposition.

Above the front wall of the load-carrying space of the vehicle a collector channel 62 is arranged. The front wall of the channel 62 is approximately co-planar with the conveyor belt afforded principally by the parts 40 to 44 while the side walls extend vertically parallel to the direction P and at a distance apart which, as can be seen in FIGURE 3, is substantially greater than the distance between the opposite edges of the conveyor belt just mentioned. A pair of spring steel rods 63 are secured to that side wall of the collector channel 62 which is closest to the beam 12. The two rods are secured to said wall at a point close to the front wall of the channel and also close to the mouth of the latter. When seen in side elevation (FIGURE 2) the two rods 63 are inclined upwardly and rearwardly from their fastening point relative to the direction P to locations inside the load-carrying space of the vehicle. When seen in plan (FIGURE 3) the two rods 63 curve inwardly towards the center of the load-carrying space of the vehicle from their fastening point. Shorter and longer arms 64 and 65 project forwardly from the frame beams 11 and 12 respectively and, as seen in the plan view of FIGURE 3, are oppositely inclined to the direction P. The leading ends of the two arms 64 and 65 are both forked, the forks supporting vertical pivot pins 66 about which horizontal circular guide discs 67 are freely rotatable.

Towards the left-hand side of the vehicle, viewed in the direction P, a pair of vertically spaced horizontal lugs 68 are secured to the front side of the tubular beam 10. The lugs 68 are sandwiched between the upper and lower limbs of a forked bracket 69 and a vertical pivot pin 70 is entered through aligned holes in the lugs 68 and the limbs of the bracket 69. One end of a draw-bar 71 is rigidly secured to the vertically disposed base of the bracket 69, said draw-bar having its leading end adapted for connection to the tow-bar of an agricultural tractor or other propelling vehicle. Two further vertically spaced horizontally disposed lugs 72 project forwardly from the tubular beam 10 at the end of the latter closest to the pivot pin 70. A vertical pivot pin 73 is employed to turnably connect the end of a horizontally disposed hydraulic cylinder 74 to the lugs 72. The hydraulic cylinder 74 contains a piston the free end of the piston rod 75 of which is turnably connected to one side of the draw-bar 71 with the aid of a vertical pivot pin 76 and a pair of vertically spaced horizontally disposed lugs 77.

Frame beams 78 (FIGURE 4) project rearwardly of the vehicle parallel to the direction P, the rearmost ends of these beams being interconnected by a relatively perpendicular horizontal beam 79. Two horizontal and parallel shafts 80 and 81 are journalled in the beam 79 and in a further beam of the frame of the vehicle so as to extend parallel to the beams 78 at two locations between the latter beams. The shafts 80 and 81 carry pairs of sprockets around which endless chains 82 carrying channel-shaped beams 83 are wound. The sprockets that have just been mentioned co-operate with the chains 82 and beams 83 in substantially the same manner as has previously been described with reference to the parts 6, 7 and 8 or 16, 17 and 18 to form a conveyor belt. A screen 84 is mounted at the right-hand end of the conveyor belt just mentioned as viewed in the direction P, the uppermost edge of said screen 84 being located approximately half-way up the height of the vehicle. Two beams 85 project upwardly from the beam 79 and are inclined rearwardly from that beam at a few degrees to the vertical. The uppermost ends of the two beams 85 are interconnected by a horizontal beam 86. Shafts 87 that extend parallel to the two beams 85 are journalled in bearings carried by the beam 86 and supported from the two beams 85 respectively. The two shafts 87 carry pairs of sprocket wheels 88 around which endless chains 89 carrying channel-shaped cross-section beams 90 are wound. The parts 88, 89 and 90 co-operate to form a conveyor belt in substantially the same manner as previously described with reference to the parts 6, 7 and 8 or the parts 16, 17 and 18.

A lower portion of the rear of the load-carrying space of the vehicle is closed by a rear wall 91 that is fastened to the frame beams 1 and which projects vertically upwardly therefrom throughout approximately half its height, its upper half being inclined forwardly of the vehicle into the interior of the load-carrying space. The uppermost edge of the rear wall 91 is located at a level approximately half-way up the height of the load-carrying space, the remaining upper region of the rear of this space being closed by a grid (not shown) that interconnects the side walls 4. The rear ends of the frame beams 1 have two hydraulic cylinders 92 turnably connected to them with the aid of horizontal pivot pins 92A that extend perpendicular to the direction P. The hydraulic cylinders 92 contain pistons the free ends of the rods 93 of which are pivotally connected by pins 94A to supports 94 secured to the lower portions of the two side walls 4 of the load-carrying space of the vehicle.

The various conveyor belts that have been described including the one that principally affords the floor of the load-carrying space are adapted to be driven, during use of the vehicle, by rotary power derived from the power take-off shaft of the agricultural tractor or other towing vehicle. To this end, a gear casing 95 is fastened to the tubular beam 10 between the lugs 68 and 72, said gear casing having a forwardly projecting splined or otherwise keyed input shaft 96 to which rotary power can be transmitted from the power take-off shaft of the agricultural tractor or other towing vehicle through the intermediary of a telescopic transmission shaft having universal joints at its opposite ends. A pulley 98 (FIGURE 2) is mounted on a shaft rotatably journalled in a bearing carried by a support (not illustrated for the sake of simplicity) that projects rearwardly from the beam 13 closest to the beam 11 and is arranged to be driven through speed reduction gearing in the gear casing 95 by way of a telescopic transmission shaft 97 (FIGURE 3) having universal joints at its opposite ends. The pulley 98 is in driving connection with a pulley 100 secured to one end of the shaft 15 by way of a twisted band, belt or rope 99. That portion of the shaft 15 which is closest to the pulley 100 is entered through a gear casing 101 an output shaft of which is connected by a telescopic transmission shaft 102 having universal joints at its opposite ends to a further gear casing 103 mounted on the beam 39 closest to the beam 11 at the level of the shaft 41. The gear wheels within the casing 103 transmit rotary drive from the transmission shaft 102 to the shaft 41.

The input shaft 96 of the gear casing 95 is also connected through the gear wheels contained within said casing to a telescopic transmission shaft 104 having universal joints at its opposite ends. The shaft 104 extends alongside the left-hand, as seen in the direction P, side wall 4 and is in driving connection with the input shaft of a gear casing 105 (FIGURE 4) located near the rear wall 91. An output shaft of the gear casing 105 drives a gear wheel 107 by way of a coupling 106, the gear wheel 107 being in mesh with a further gear wheel 108 secured to one end of the rearmost shaft 5 of the conveyor belt which affords the floor of the load-carrying space of the vehicle.

A second coupling 109 establishes a connection between a second output shaft of the gear casing 105 and the leading end of the shaft 80. The opposite rearmost end of the shaft 80 carries a bevel pinion 110 whose teeth mesh with those of a bevel pinion 111 secured to one end of a shaft 112 that is rotatably mounted internally of the hollow frame beam 79. The opposite end of the shaft 112 carries a bevel pinion 113 whose teeth mesh with those of a bevel pinion 114 carried at the lowermost end of a downward extension of the right-hand, as viewed in the direction P, shaft 87.

The coupling 106 located between the gear casing 105 and the gear wheel 107 can be engaged or disengaged by a lever 115. A cable 116 is connected to the operating end of the lever 115 and extends forwardly therefrom through an eye 117 (FIGURE 3) carried at the uppermost end of the pivot pin 70 to a control lever 118 that is turnable about a horizontal pivot pin 119 mounted adjacent the leading end of the draw-bar 71. The control lever 118 and its pivotal mounting incorporate means to retain the control lever, and thus the lever 115, in any one of at least two different positions corresponding to operative and inoperative settings of the coupling 106.

In the use of the machine which has been described, its draw-bar 71 occupies the position shown in full lines in FIGURE 3 of the drawings and is connected to the tow-bar of an agricultural tractor or other propelling vehicle. The input shaft 96 is placed in driven connection with the power take-off shaft of the tractor or other vehicle in the manner previously described. It is noted that the relative dispositions of the tractor and the vehicle will be such that the path of travel of the pick-up mechanism formed by the conveyor belts which include the chains 17 and 43 respectively is located to one side of the path of travel of the tractor. As the machine moves over the field, the chains 17 and 43 are driven in such a way that the relatively facing runs thereof move upwardly along the beams 13 and 39. Bales of crop lying on the field are guided between the arms 64 and 65 by the discs 67 and beneath the wheels 59. The wheels 59 ensure that bales cannot reach the machine piled one upon the other. Each bale is moved upwardly between the beams 18 and 44 and it is noted that, since the beams 13 and 39 are displaceably connected to the frame, the distance between them can temporarily increase against resilient opposition so that bales of different thicknesses and presented with varying dispositions can be accommodated. The ground wheels 20 can rise and wall carrying the beams 13 with them to match undulations in the surface of the ground over which the machine is travelling. The widths of the two conveyor belts, measured in a horizontal direction perpendicular to the direction P, are preferably greater than the maximum length of bale which is likely to be met with so that different sizes of bale can be picked up during one operation, the bales passing between the beams 18 and 44 at random dispositions.

Elevated bales pass between the teeth of the star wheels 30 and 47 which act as a one-way gate since the shafts to which they are secured can turn only in the directions A and B and since their teeth bite into and engage the material of the bales. It will be apparent that the bales are pushed upwardly one-by-one into the collector channel 62, the spring steel rods 63 acting to direct them towards a central region of the front part of the load-carrying space of the vehicle before they fall downwardly onto the beams 8. This arrangement ensures that a number of bales do not collect only in one region of the load-collecting space.

When the front part of the load-collecting space is full, the control lever 118 is actuated to cause the upper runs of the chains 7 to move slowly rearwardly carrying the bales lying on the beams 8 with them. When these bales are moved to the rear, the control lever 118 is returned to the inoperative position whereupon further bales can be packed into the front part of the load-carrying space.

When the load-carrying space is eventually completely filled, the hydraulic cylinders 24 are actuated to raise the beams 13 carrying the ground wheels 20 clear of contact with the ground. The hydraulic circuits and controls for the cylinders 24, 74 and 92 have not been illustrated for the sake of simplicity but it is pointed out that the pump necessary to provide oil or other liquid medium under pressure can be mounted on the agricultural tractor or other propelling vehicle and connected to the various cylinders by flexible ducts. Alternatively, the pump can be mounted on the vehicle itself and powered from the power take-off shaft of the agricultural tractor or other propelling vehicle. Upon raising the wheels 20 clear from contact with the ground, the hydraulic cylinder 74 is actuated to place the draw-bar 71 in the position partly illustrated in broken lines in FIGURE 3 of the drawings in which the leading end of the draw-bar is located approximately centrally of the vehicle so that the path of travel of the tractor and the vehicle itself will coincide.

When the vehicle reaches the place at which the bales are to be discharged, the hydraulic cylinders 92 are actuated to bring the load-carrying space of the vehicle to the position illustrated in FIGURE 5 of the drawings. The rear wall 91 is thus moved into an inoperative position leaving a lower region of the rear of the load-carrying space open. The inclined position shown in FIGURE 5 also relieves the pressure on the lower bales at the rear of the vehicle. Upon setting the controls to cause the chains 7, 82 and 89 to be driven, the bales will fall rearwardly out of the load-carrying space onto the beams 83 and 90 and will be moved laterally towards the left in FIGURE 4 of the drawings. The oblique conveyor belt which includes the beams 90 tends to cause the bales to fall onto the lower belt which includes the beams 83 in a disposition such that they extend longitudinally of the direction of travel of the lower belt. The delivered bales may be further displaced by roller conveyors or other mechanisms if desired.

The vehicle which has been described is capable of rapidly collecting bales lying on the ground and, similarly, of rapidly discharging a load of bales. The power consumption of the vehicle is small relative to its size and it can be employed independently of other machines except for a tractor or other propelling vehicle.

The vehicle illustrated in FIGURE 6 of the drawings is basically similar to that already described and, accordingly, the same reference numerals are employed to describe those parts that are similar, or identical, to parts illustrated in FIGURES 1 to 5. Supports 121 are mounted at the leading ends of the frame beams 1 and two corresponding beams 120 are turnably connected to the supports with the aid of a horizontal shaft 122 that extends perpendicular to the intended direction of travel of the vehicle that is indicated by the arrow F in FIGURE 6. Horizontal stub shafts 123 that are parallel to the shaft 122 are mounted adjacent the leading ends of the beams 120 and afford axles for ground wheels 124 that are rotatably mounted thereon. A shaft 125 extending parallel to the shaft 122 is rotatably journalled in the leading ends of the two beams 120 and a conveyor belt similar to those that have previously been described is arranged between the two shafts 122 and 125. The conveyor belt comprises pairs of sprockets 126, endless chains 127 and beams 128 of channel-shaped cross-section that are fastened to said chains.

The leading ends of the two beams 120 have corresponding beams 129 secured to them, the beams 129 extending obliquely upwardly and forwardly from the beams 120 relative to the direction F. Struts 130 stiffen the connections between the beams 120 and 129. Two angular beams 131 have their leading ends turnably connected to the leading ends of the beams 129 by a horizontal shaft 132. The beams 131 project rearwardly relative to the direction F from the shaft 132. Tension springs 133 are arranged between anchorages on the beams 131 and struts 130 in such a way that they tend to turn the beams 131 in a clockwise direction about the shaft 132 as seen in FIGURE 6. Stops 134 carried by the struts 130 prevent clockwise turning movement of the kind just mentioned beyond the position shown in FIGURE 6 by bearing against the lowermost edges of the angular beams 131.

Horizontal bearings carried by the angular beams 131 rotatably support two shafts 135 and 136 that extend parallel to the shafts 122 and 125. A conveyor belt similar to the ones that have previously been described is arranged on the shafts 135 and 136 and comprises pairs of sprockets 137, endless chains 138 and channel-shaped cross-section beams 139 secured to the chains 138. It will be apparent from FIGURE 6 of the drawings that the plane containing the lowermost runs of the chains 138 is parallel to that containing the uppermost runs of the chains 127 when the beams 131 are in contact with the stops 134. It will also be apparent that the pivotal shaft 132 is located at a slightly higher level than, and in front of relative to the direction F, the leading rotary shaft 135 of the conveyor belt which includes the parts 137 to 139.

The uppermost ends of the supports 121 carry horizontal stub shafts 140 that extend parallel to the shaft 122 and on which hydraulic cylinders 141 are turnably mounted. Each hydraulic cylinder 141 contains a piston the free end of the piston rod 142 of which is turnably connected to a central region of the corresponding strut 130 by a pivot 142A.

A horizontal shaft 143 extending parallel to the shaft 122 is rotatably mounted in bearings carried by the leading ends of the frame beams 1. Supports 144 project from the front wall of the vehicle at a substantial distance above the frame beams 1 and a horizontal shaft 145 parallel to the shaft 143 is rotatably mounted between said supports. The shafts 143 and 145 are, in fact, contained in a common vertical plane. A conveyor belt similar to those that have previously been described is arranged on the two shafts 143 and 145 and comprises pairs of sprockets 146, endless chains 147 and channel-shaped cross-section beams 148 secured to the chains 147.

Further pairs of supports 149 are fastened to the front wall of the vehicle and beams 150 project upwardly and forwardly therefrom relative to the direction F. Two horizontal beams 151 project forwardly from the uppermost end of the front wall. A horizontal shaft 152 parallel to the shaft 122 interconnects the leading ends of the beams 151 and a pair of beams 153 are pivotally mounted on said shaft so as to depend therefrom.

In the position of the beams 153 illustrated in FIGURE 6, they extend vertically downwardly from the shaft 152 and bear against stops afforded by the leading ends of the beams 150. Tension springs 154 interconnect anchorages towards the lowermost ends of the beams 153 and the uppermost ends of the lower beams 150 and thus tend to maintain the beams 153 in the positions illustrated in FIGURE 6.

A horizontal shaft 155 parallel to the shaft 152 is journalled in the lowermost ends of the beams 153 and a similar shaft 156 is journalled in said beams towards the uppermost ends thereof. A conveyor belt similar to those previously described is arranged on the shafts 155 and 156 and comprises pairs of sprockets 157, endless chains 158 and channel-shaped cross-section beams 159 secured to the chains 158. The perpendicular distance between the shaft 155 and the shaft 145 is approximately half that between the shaft 155 and the shaft 143 when the beams 153 occupy the positions shown in FIGURE 6. The perpendicular distance between the shafts 155 and 156 is approximately equal to the perpendicular distance between the shafts 143 and 145.

A shaft (not shown) that extends parallel to the shaft 152 is journalled in an upper region of the rear of the vehicle and pairs of sprockets 160 are secured to that shaft and the shaft 152. Endless chains 161 are wound around the sprockets 160 and arms 162 project perpendicularly outwardly from the chains 161.

The drives to the various conveyor belts of the vehicle are not shown for the sake of simplicity but it will be apparent that they can be achieved in a simple manner with the aid of rope, belt or chain transmissions of the kind described with reference to FIGURES 1 to 5 of the drawings, said transmissions being driven by the power take-off shaft of the tractor or other vehicle used for propulsion. The vehicle has a draw-bar (not shown) by which it can be connected to the tow-bar of a tractor or other propelling vehicle.

In the use of the vehicle illustrated in FIGURE 6, it is drawn over the ground in the direction F by a tractor or other propelling vehicle, the lowermost conveyor belt following undulations in the ground surface with the ground wheels 124. Bales lying on the ground are moved upwardly and rearwardly between the conveyor belts which include the chains 127 and 138 and are passed therefrom between the conveyor belts which include the chains 147 and 158. The latter conveyor belts elevate the bales to a point at which they are pushed rearwardly into the load-carrying space of the vehicle by the arms 162 that are moving in the direction indicated by the arrow D in FIGURE 6. The bales then fall through an opening in an upper region of the front wall of the vehicle onto the conveyor belt which includes the chains 7. It will be apparent that the spring-loaded pivotal mounting of the two conveyor belts which include the chains 138 and 158 enables bales of different sizes to be dealt with and makes the precise orientation of each bale when it is presented to the machine unimportant.

The upper run of the conveyor belt which includes the chain 7 can be moved rearwardly at intervals to enable the whole load-carrying space of the vehicle to be filled without difficulty and, when the vehicle is completely filled, the piston rods 142 are retracted into the cylinders 141 to lift the ground wheels 124 well clear of contact with the ground. The vehicle can then be transported from one place to another without difficulty. The bales are discharged from the vehicle in a manner similar to that previously described with reference to FIGURES 1 to 5 of the drawings.

The agricultural vehicle which is shown in FIGURES 7, 8 and 9 of the drawings is a machine for picking up and transporting bales, the machine having two longitudinal frame beams 163 the front ends of which are interconnected by a relatively perpendicular horizontal frame beam 164. The two frame beams 163 are interconnected by further beams (not visible in the drawings) that extend parallel to the beam 164. A horizontal axle 165 (FIGURE 7) that extends parallel to the beam 164 is secured to the beams 163 approximately centrally of the vehicle and ground wheels 166 are rotatably mounted at each end of said axle. The vehicle has a body 167 in the form of a load-carrying space, the body being turnably connected to the frame beams 163 by means of two horizontal stub shafts 168 that extend parallel to the beam 164 and which are mounted on supports 169 carried at the rear ends of the frame beams 163. The bottom of the load-carrying space afforded by the body 167 is provided with a floor in the form of a conveyor belt similar to the parts 5, 6, 7 and 8 that have previously been described. A horizontal stub shaft 170 extending parallel to the stub shafts 168 projects from one of the frame beams 163 between the axle 165 and the beam 164. The base of a hydraulic cylinder 171 is turnably mounted on the stub shaft 170, the cylinder 171 housing a piston the free end of the rod 172 of which is turnably connected to a horizontal stub shaft 173 secured to a side wall of the body 167.

As can be seen in FIGURES 7 and 8 of the drawings, the aforementioned conveyor belt (not shown) does not extend up to the front wall of the body 167. The front end of the body 167 is recessed, the recess housing a conveyor belt generally indicated by the reference numeral 174. The conveyor belt 174 extends horizontally perpendicular to the frame beams 163 and is supported from those beams by pillars 175. The belt 174 is arranged around shafts 176 and 177 (FIGURES 8 and 9) that extend parallel to the frame beams 163 and which are located close to the respective opposite sides of the vehicle. Supports 178 are fastened to the front wall of the body 167 at its lowermost extremity in the aforementioned recess. As can be seen in FIGURE 9 of the drawings, the supports 178 are located close to the respective opposite sides of the vehicle. Two crank shafts 179, that are rotatable about substantially vertical axes, are journalled in the supports 178, corresponding cranks of the two crank shafts 179 being interconnected by horizontal beams 180 that extend parallel to the frame beam 164. As can be seen in the drawings, vertical bearings 181 secured to the beams 180 are arranged around the cranks of the crank shafts 179. The beams 180 are arranged immediately in front of, and at a level slightly higher than, the upper run of the conveyor belt 174.

The lowermost ends of the two crank shafts 179 are provided with bevel pinions 182 the teeth of which mesh with those of further bevel pinions 183 fastened to the horizontal shafts 176 and 177 respectively. Two frame beams 184 and 185 project upwardly and forwardly from the beam 164 relative to the intended direction of operative travel of the vehicle. The uppermost leading ends of the two beams 184 and 185 are interconnected by a horizontal beam 186 (FIGURE 9) that extends parallel to the beam 164. A bracket 187 projects forwardly and downwardly from the beam 186 relative to the intended direction of operative travel of the vehicle.

A conveyor member in the form of a conveyor belt generally indicated by the reference numeral 188 is arranged between the beams 184 and 185 and includes two relatively parallel beams 189 and 190. The lowermost ends of the two beams 189 and 190 have bearings in which a horizontal shaft 191 is journalled. Two ground wheels 197 are rotatably mounted at opposite ends of the shaft 191 and the beams 189 and 190 are inclined upwardly and rearwardly from the shaft 191 relative to the intended direction of operative travel of the vehicle. A horizontal shaft 192 parallel to the shaft 191 is rotatably journalled in horizontal bearings mounted at the uppermost ends of the beams 189 and 190, the shafts 191 and 192 carrying pairs of sprockets 193 around which endless chains 194 are wound. Catching members in the form of short metal beams 195 of L-shaped cross-section are secured to the chains 194. A plate 196 (FIGURE 9) interconnects the beams 189 and 190 and the foremost runs of the chains 194, relative to the intended direction of operative travel of the vehicle, bear against the plate 196.

Two coupling rods 198 (FIGURE 8) are turnably connected to supports 200 carried by the horizontal beam 186 with the aid of pivot pins 199 extending parallel to said beam 186. The ends of the coupling rods 198 remote from the supports 200 are turnably connected to the frame beams 189 and 190 respectively by stub shafts (not visible) that extend parallel to the pivot pins 199. Further stub shafts 201 parallel to the pins 199 project from the beams 189 and 190 respectively at levels a substantial distance above those of the connection points of the coupling rods 198 to said beams 189 and 190. The bases of two hydraulic cylinders 203 are pivotally connected to lugs carried on the beam 164 with the aid of horizontal pivot pins 204. The hydraulic cylinders 203 house pistons the free ends of the rods 202 of which are turnably connected to the aforementioned stub shafts 201.

A second conveyor member in the form of a second conveyor belt generally indicated by the reference numeral 205 extends substantially parallel to the conveyor belt 188 when it occupies the position shown in FIGURES 7 and 8 of the drawings. The second conveyor belt 205 is disposed in front of the first conveyor belt 188 with respect to the intended direction of operative travel of the vehicle. The second conveyor member includes two upwardly and rearwardly inclined parallel frame beams 206 and 207, upper and lower parallel horizontal shafts 208 and 209 that are parallel to the shafts 191 and 192, pairs of sprockets 210 secured to the shafts 208 and 209, endless chains 211 wound around the sprockets 210 and catching members in the form of short metal beams 212 of L-shaped cross-section secured to the chains 211. Horizontal stub shafts 213 project from the beams 206 and 207 parallel to the shafts 208 and 209 and the ends of coupling rods 214 are turnably mounted on said stub shafts. The coupling rods 214 project forwardly and downwardly from the stub shafts 213 and their lowermost ends are turnably connected to pivot pins 215 that are parallel to the stub shafts 213 and which are carried by support plates 216 fastened to the horizontal beam 186. Coupling rods 217 pivotally interconnect the parallel pairs of stub shafts 201 and 213.

Stub shafts 218 that are parallel to the stub shafts 201 project from the beams 189 and 190 at short distances above the stub shafts 201 and the ends of rods 219 are turnable about the respective stub shafts 218. The ends of the rods 219 that are remote from the stub shafts 218 are of reduced diameter and are formed with screw-threads. The reduced diameter ends are entered through holes in lugs 220 projecting from the beams 206 and 207 towards the uppermost ends thereof. The shoulders between the thicker and thinner ends of the rods 219 bear against the lugs 220 and helical compression springs 221 that are wound around the reduced diameter ends of the rods bear between the lugs 220 and nuts 222 that are adjustably mounted on said ends. The shoulders between the thicker and thinner portions of the rods 219 afford stops that prevent the upper end of the second conveyor member 205 from moving towards the first conveyor member under the action of the compression springs 221. The support plates 216 are provided with further stops (not visible) that prevent the lower end of the second conveyor member from moving towards the first conveyor member beyond the position illustrated in FIGURES 7 and 8 under the action of tension springs 223 that extend between anchorages on the coupling rods 214 and anchorages on the support plates 216.

A draw-bar 225 is pivotally connected to the beam 164 towards one end thereof with the aid of a vertical pin 224. A further vertical pin 229 which is spaced along the beam 164 from the pin 224 has the base of a hydraulic cylinder 228 turnably mounted on it. The hydraulic cylinder 228 houses a piston the free end of the rod 227 of which is turnably connected to one side of the draw-bar 225 with the aid of a vertical pin 226. A hood-shaped mouth 230 is formed in the front wall of the body 167 so as to open immediately above the upper ends of the first and second conveyor members. The drive transmissions to the various working parts are not illustrated for the sake of simplicity but it will be apparent that they can be readily effected in a manner somewhat similar to that described with reference to FIGURES 1 to 5 of the drawings.

In the use of the vehicle illustrated in FIGURES 7 to 9 of the drawings, the leading end of its draw-bar 225 is connected to the tow-bar of a tractor or other propelling vehicle and the leading end of the shaft 176 is placed in driven connection with the power take-off shaft of the tractor or propelling vehicle by means of a transmission shaft having universal joints at its opposite ends. The draw-bar 225 preferably occupies a setting such that the path of travel of the vehicle is located wholly or substantially wholly to one side of the path of travel of the tractor or propelling vehicle. The arrangement for effecting this is similar to that previously described and best illustrated in FIGURE 3. The two conveyor belts 188 and 205 are driven in such a way that the catching members afforded by the parts 195 and 212 move upwardly on the sides of the conveyor belts that face one another in the direction indicated by the arrows A and B respectively in FIGURE 8. The bracket 187 prevents piled-up bales from being fed to the vehicle and tends to move the bales into favourable pick-up positions. Bales of different sizes can be elevated between the two conveyor belts 188 and 205 due to the resilient mounting of the second conveyor member. After elevation, each bale is pushed into the mouth 230 and falls rearwardly into the interior of the body 167. Some bales will fall directly onto the conveyor belt 174 but the majority of them fall a little further rearwardly onto the front end of the conveyor belt affording the floor of the body 167. As in the previously described cases, when the front end of the body 167 is full, the conveyor belt affording its floor is moved rearwardly carrying the bales lying thereon with it. More bales can then be loaded into the front of the body 167 until it is full.

When the vehicle is fully loaded, the hydraulic cylinders 203 are actuated to raise the conveyor belt 188 and ground wheels 197 clear of contact with the ground. The hydraulic cylinder 228 is actuated to bring the draw-bar 225 to a position similar to that indicated for the draw-bar 71 in broken lines in FIGURE 3 in which position the path of travel of the vehicle approximately coincides with the path of travel of the tractor or other vehicle which is towing it. When the vehicle arrives at its discharge station, the hydraulic cylinder 171 is actuated to turn the body 167 in a clockwise direction about the stub shafts 168 as seen in FIGURE 7 of the drawings. The clearance between the conveyor belt 174 and the edges of the opening of the body 167 located thereabove is thus increased to such an extent that bales can pass readily along the conveyor belt 174. Upon driving the conveyor belt 174, bales lying thereon will be discharged laterally of the vehicle. The beams 180 are reciprocated by the crank shafts 179 in such a way as to tend to straighten bales lying on the conveyor belt 174 so that they lie with their greatest dimensions parallel to the length of the conveyor belt. Upon driving the conveyor belt affording the floor of the body 167 in a direction such that its upper run moves forwardly of the vehicle, bales lying thereon will drop forwardly onto the transverse belt 174 due to the fact that the floor of the body 167 is inclined upwardly and forwardly from the rear of the vehicle after actuation of the hydraulic cylinder 171. The arrangement allows the bales to be rapidly and progressively discharged. If desired, the rear wall (not shown) of the body 167 of the vehicle may be pivotally mounted so that bales can be discharged from the rear of the vehicle.

What I claim is:

1. An agricultural vehicle having a frame and a bale pick-up mechanism supported on said frame at the forward part of said vehicle, said vehicle having a load-carrying chamber supported by said frame located rearwardly of said mechanism, said pick-up mechanism having opposing conveyors disposed one above the other for urging said bales to said load-carrying chamber, the lower of said two conveyors having a lowermost portion located adjacent the ground and coupled to the frame of the vehicle, said lower conveyor being displaceable upwardly relative to said frame and having members normally in contact with the ground whereby bales lying on the ground are picked up as the vehicle moves over the ground during operation, the upper of said two conveyors being pivotally coupled to the frame of said vehicle to be displaceable upwardly relative to said lower conveyor.

2. An agricultural vehicle having a frame and a bale pick-up mechanism supported on said frame at the forward part of said vehicle, said vehicle having a load-carrying chamber supported by said frame located rearwardly of said mechanism, said mechanism including two opposing obliquely ascending conveyors disposed one above the other for moving bales into the chamber, the lowermost portion of the lower conveyor being located adjacent the surface of the ground during operation, said lower conveyor being connected ot said vehicle with coupling means, said coupling means being connected to said frame adjacent and to one side of said pick-up mechanism, said coupling means being pivotable with respect to both the frame of the vehicle and said lower conveyor, said lowermost end of the lower conveyor being provided with ground wheels which contact and move over the ground during operation.

3. The invention of claim 2, wherein the coupling member comprises a hydraulic cylinder the piston and piston rod of which are extendable and retractable to adjust the vertical position of said lower conveyor relative to the frame of the vehicle.

4. The invention of claim 2, wherein the vehicle frame includes guide members for said lower conveyor.

5. The invention of claim 2, wherein second coupling means interconnects said frame and said lower conveyor, said second coupling means being pivotally coupled to both the frame and said lower conveyor.

6. The invention of claim 5, wherein coupling rods are pivotally connected to one end of the upper of said conveyors, the opposite ends of said coupling rods being pivotally connected to the frame of the vehicle, connecting members extending between points spaced from the junctions of said coupling rods with the upper conveyor to the lower conveyor whereby relative bodily displacements of the two conveyors can take place in directions parallel to the longitudinal axes of the connecting members.

7. A vehicle as claimed in claim 6, wherein the upper of said two conveyors is pivotally connected to the frame of the vehicle adjacent to the leading end of said upper conveyor.

8. A vehicle as claimed in claim 2, wherein star wheels are mounted on said vehicle adjacent the upper end of at least one of said conveyors, said star wheels being turnable only in a direction corresponding to the intended direction of movement of the associated conveyor.

9. An agricultural vehicle having a frame and a bale pick-up mechanism supported on said frame at the forward part of said vehicle, said vehicle having a load-carrying chamber supported by said frame located rearwardly of said mechanism, said pick-up mechanism having opposing conveyors disposed one above the other for urging said bales to said load-carrying chamber, the lower of said two conveyors having a lowermost portion located adjacent the ground, said lower conveyor being pivotally coupled to the frame of the vehicle and displaceable upwardly relative thereto, said upper conveyor being pivotally coupled to the frame and displaceable upwardly relative to said frame and said lower conveyor, stop means located adjacent said conveyors to maintain a minimum distance between the two conveyors and spring means associated with said conveyors to urge the two conveyors in a predetermined relative position.

10. An agricultural vehicle having a frame, a bale pick-up mechanism supported on said frame at the forward part of said vehicle, said vehicle having a load-carrying chamber comprising a large substantially unobstructed area surrounded by substantially upright walls, said chamber being supported by said frame and located rearwardly of said mechanism, a coupling member connected to said frame adjacent and to one side of said pick-up mechanism whereby said vehicle can be towed by said coupling member with a prime mover so that bales are picked up and pushed into said chamber by said mechanism, the center of the lowermost portion of said pick-up mechanism being located to one side of the longitudinal center line of said vehicle and said mechanism being displaceable upwardly relative to the frame of said vehicle, guide arms projecting forwardly of the lowermost portion of said mechanism, said chamber having a load supporting floor with conveying means for moving a load longitudinally of said vehicle, said conveying means forming part of said floor in said chamber.

11. The invention of claim 1, wherein said lower conveyor is connected to said vehicle with coupling means, said coupling means being connected to said frame and pivotable with respect to said frame and said lower conveyor.

12. The invention of claim 1, wherein the center of the lowermost portion of said mechanism is located to one side of the longitudinal center line of said vehicle and a coupling member is located on the opposite side of said center line whereby said vehicle can be towed by said coupling member with a prime mover so that bales are picked up and pushed into said chamber and said mechanism and the paths of said vehicle and said prime mover are noncoincidental during operation.

13. The invention of claim 1, wherein the pick-up mechanism is disposed adjacent the forward wall of the load-carrying chamber, said wall extending approximately perpendicular to the intended direction of travel and having a hole therein, whereby said pick-up mechanism pushes bales through said hole in said wall directly into said chamber.

14. The invention of claim 11, wherein the coupling means comprises a hydraulic cylinder the piston and piston rod of which are extendable and retractable to adjust the vertical position of the conveyor relative to the frame of the vehicle.

15. A vehicle as claimed in claim 11, wherein the vehicle frame includes guide members for said conveyor.

16. A vehicle as claimed in claim 11, wherein a further coupling means interconnects said frame and said conveyor, the second coupling member being pivotally coupled to both the frame and the conveyor.

17. The invention of claim 1, wherein coupling rods are pivotally connected to one end of the upper of said conveyors, opposite ends of said coupling rods being pivotally connected to the frame of the vehicle, said connecting members extending between points spaced from the junctions of said coupling rods with the upper conveyor to the lower conveyor whereby relative bodily displacements of the two conveyors can take place in directions parallel to the longitudinal axes of the connecting members.

18. A vehicle as claimed in claim 17, wherein the upper of the two conveyors is pivotally connected to the frame of the vehicle adjacent the leading end of said upper conveyor.

19. The invention of claim 1, wherein a number of star wheels are provided adjacent the upper end of at least one of the conveyors, said star wheels being freely turnable only in a direction corresponding to the intended direction of movement of the associated conveyor.

20. A vehicle as claimed in claim 1, wherein said conveyors are obliquely ascending for feeding picked-up bales to further conveyors which are substantially vertically ascending.

21. A vehicle as claimed in claim 20, wherein one of said further conveyors occupies a fixed position relative to the frame of the vehicle, a second of said further conveyors being pivotally connected to said frame.

22. A vehicle as claimed in claim 21, wherein additional conveyor means is arranged near the top of the vehicle whereby bales elevated by the further conveyors are urged into the load-carrying chamber.

23. A vehicle as claimed in claim 22, wherein the conveyor means is circulating endless means carrying arms that move in a direction substantially parallel to the intended direction of travel.

24. The invention of claim 1, wherein one of the conveyors is adapted to be driven through the intermediary of a telescopic transmission shaft.

25. A vehicle as claimed in claim 7, wherein stops are provided to maintain a minimum distance between the two conveyors.

26. A vehicle as claimed in claim 7, wherein spring means is arranged to urge the two conveyors in a predetermined relative position.

27. A vehicle as claimed in claim 9, wherein the leading end of said upper conveyor is connected by supports to the leading end of the lower conveyor.

28. The invention of claim 10, wherein the load-carrying chamber of the vehicle is provided internally with guide rods for bales pushed into the chamber.

29. A vehicle as claimed in claim 28, wherein the guide rods are made of spring steel.

30. The invention of claim 10, wherein the front of the pick-up mechanism is provided with vertically displaceable guide members arranged to pass over bales to be picked up.

31. A vehicle as claimed in claim 30, wherein said guide members are turnable about a substantially horizontal axis extending substantially perpendicular to the intended direction of operative travel of the vehicle.

32. A vehicle as claimed in claim 30, wherein the guide members are pneumatically wheel tires.

33. The invention of claim 1, wherein the load-carrying chamber includes a floor and said vehicle includes a discharging device supported on said frame, a portion of said floor being vertically displaceable whereby the distance between said region of the floor and the discharging device can be increased.

References Cited

UNITED STATES PATENTS

| | | |
|---|---|---|
| 1,289,169 | 12/1918 | Henderson. |
| 2,525,870 | 10/1950 | Crofoot |
| 2,586,324 | 2/1952 | Graves. |
| 2,597,220 | 5/1952 | Appel. |
| 2,634,852 | 4/1953 | Clauss. |
| 2,675,116 | 4/1954 | Collins. |
| 2,726,750 | 12/1955 | Collins. |
| 2,867,340 | 1/1959 | Brownlee et al. _____ 214—521 |
| 3,120,887 | 2/1964 | Holcer. |
| 3,251,485 | 5/1966 | Fancher _____ 214—508 XR |

FOREIGN PATENTS 530,703   9/1956   Canada.

ALBERT J. MAKAY, *Primary Examiner.*

U.S. Cl. X.R.

56—345; 198—7; 214—83.26